Patented Sept. 23, 1947

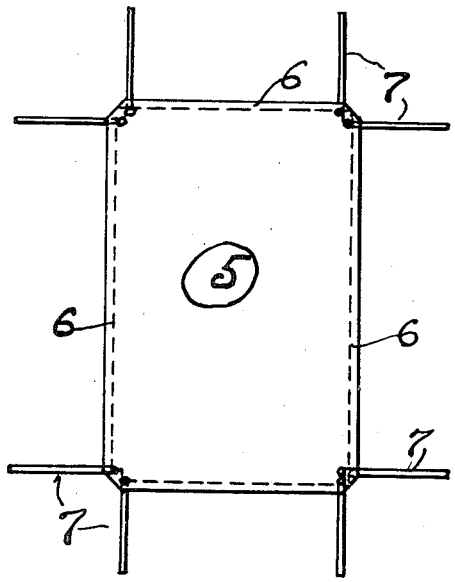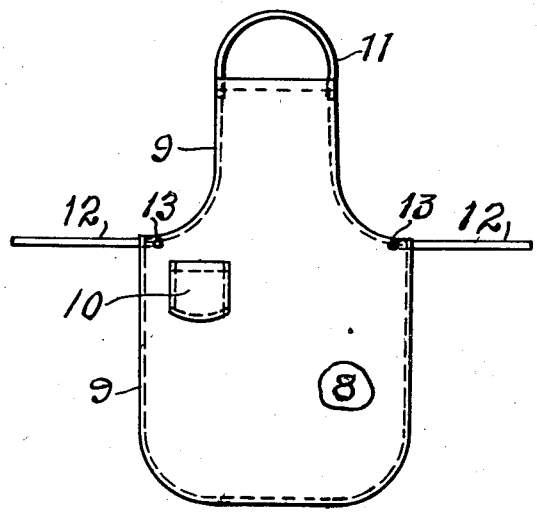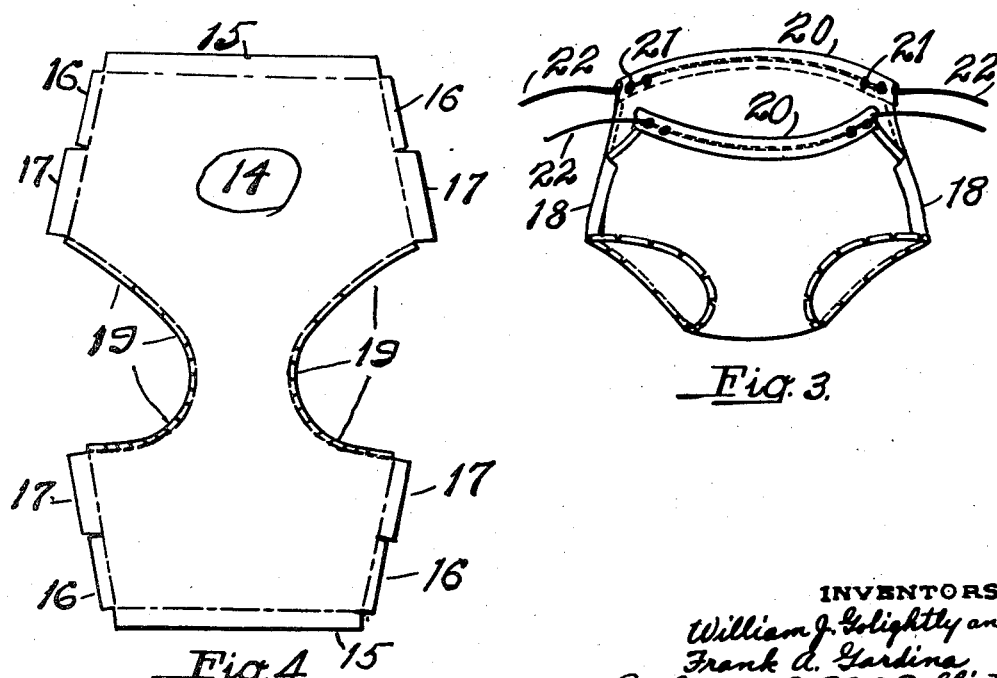

2,427,906

UNITED STATES PATENT OFFICE 2,427,906

PLASTIC ARTICLE

William J. Golightly and Frank A. Gardina, Tarentum, Pa., assignors of one-third to Edward O. Spotts, Jr., Tarentum, Pa.

Application March 8, 1944, Serial No. 525,488

1 Claim. (Cl. 2—224)

This invention relates to waterproof articles such as apparel and the like and particularly such articles made from plastic material in sheet form.

An object of the invention is to produce waterproof articles such as stork pants, aprons and protective bed sheets from plastic material which is capable of being fabricated into sheet form and in that form is flexible or pliable, tough and odorless at ordinary atmospheric temperatures and which is rendered adherent at higher temperatures so that parts of such material may be secured together when their surfaces are in engagement and are subjected to heat and pressure.

Compositions of polyvinyl acetal resin which contain substantial quantities of that substance are capable of being readily formed into sheets approximating 0.010" in thickness and are flexible, tough and odorless at atmospheric temperatures but may be cut like ordinary fabric at such temperatures. Such substances also have the characteristic of being rendered adherent or sticky at temperatures substantially above atmospheric temperatures and under conditions such that two pieces of such material may be securely fastened together by placing their surfaces in contact and subjecting the contacting surfaces to heat and pressure. One such substance which may be effectively employed in carrying forward our invention is generally known as "Butacite." It is a reaction product of polyvinyl acetal resin and butraldehyde.

A further and more specific object of our invention is, therefore, to produce waterproof articles from a composition polyvinyl acetal resin and butraldehyde in sheet form and under conditions such that the fabrication of each such article is accomplished by employing what may be termed autogenic connections in which the sheet material involved is rendered adherent by the application of heat and the connection is accomplished by forcing two surfaces of the material into intimate and close contact while in the adherent state.

In the drawings, we have illustrated several embodiments of our invention and each such article is fabricated from a composition containing polyvinyl acetal resin, such for example as Butacite, and capable of being reduced to sheet form and which has the desired characteristics. In the drawings, Fig. 1 is a plan view of a protective bed sheet made from plastic material in sheet form. Fig. 2 is an apron made from such material and provided with fabric ties or strings. Fig. 3 is a perspective view of a pair of stork pants made from such material and Fig. 4 is a plan view of the sheet material cut to pattern and before being fabricated in the form shown in Fig. 3.

In Fig. 1, a bed sheet 5 is shown as formed from polyvinyl acetal resin or a composition thereof, and as provided with reinforced or hemmed edges. Each such hemmed edge is formed by turning the material back on itself as shown at 6 and then pressing the overlapped portions into intimate contact while subjecting them to temperatures from about 180° F. to about 210° F. In this way, the bed sheet 5 is provided with what may be termed hemmed edges and is, therefore, reinforced and made more effective in resisting tearing strains. In the embodiment illustrated, each corner of the bed sheet is provided with two apertures or perforations which are located adjacent to each other and adjacent to the reinforced portions of the sheet. Each pair of perforations provides a means of securing a piece of fabric tape 7 or a piece of similar material to the sheet and the several tapes so secured to the sheet may be employed for the purpose of securing the bed sheet in place on a mattress or other article to be protected by it. As shown by the drawings, each piece of tape 7 is threaded through one pair of perforations and may be secured in place by tying.

In Fig. 2 we have illustrated an apron 8 as an embodiment of our invention. The apron may be fabricated from Butacite in sheet form and is also provided with reinforced or hemmed edges. The hems 9 at the edges are formed by turning the edge of the material back on itself and then pressing the overlapped portions into intimate contact with each other while subjecting them to heat of an intensity sufficient to accomplish the autogenous connection.

In the embodiment illustrated in Fig. 2, we have shown a pocket 10 on the front or outer side of the apron. The pocket 10 is in the form of a patch pocket and consists of a piece of Butacite cut to the desired shape and then having three of its marginal edges autogenously secured to the material of the apron 8. That is to say, the surfaces of the patch pocket 10 immediately adjacent to three of its marginal edges of the piece are held in intimate engagement with the front surface of the apron while being subjected to pressure under sufficient heat to render the material adherent.

In the apron illustrated, the yoke or neck piece 11 may be, and preferably is made from sheet Butacite or similar material and each of its ends is secured to the rear or inner face of the apron 8 by being subjected to heat and pressure as previously described. The ties or strings 12 of the apron are preferably pieces of fabric tape and are secured to the apron by being threaded through perforations such as the perforations 13 formed therein.

Fig. 4 illustrates the form to which the sheet of plastic material is cut in the operation of making a pair of stork pants. As there shown, the piece 14 is so cut as to provide for the reinforcing of its marginal edges. As shown, the top and bottom of the piece 14 are provided with flaps 15 which, when turned back onto the piece itself and secured thereto by heat and pressure, constitute the body band of the stork pants. The flaps 16 formed on the piece, when turned back on the piece and secured to place, reinforce the edges of the side vents of the completed pants and the flaps 17 constitute what may be termed the autogenous seams 18 of the pants when the piece 14 is turned to the position illustrated in Fig. 3 and the flaps 17 are caused to overlap portions of the piece and are secured thereto by the application of heat and pressure. Each series of flaps 19 shown in Fig. 3 constitute the reinforcing margin of one of the leg apertures of the completed pants. Here again the flaps are folded back onto the material and the overlapped portions are then autogenously connected together by the application of heat and pressure.

As shown in Fig. 3, each portion of the body band 20 (formed from the flaps 15) is provided with a pair of perforations 21 adjacent each end. A separate piece of tape 22 is threaded through the perforations 21 of each pair 20 and provides means for securing the pants in place around the body of the infant wearing them. That is, the tapes 22 at each side of the pants are tied together in adjusting the side vents and securing the pants on an infant.

It will be apparent that our invention may be embodied in articles other than those illustrated and that various changes, additions and omissions may be made in the structure of the individual articles without departing from the spirit and scope of our invention as defined by the appended claim.

What we claim is:

A waterproof garment made from plastic sheet material, comprising a single sheet of such material cut to pattern with flaps along marginal edges thereof and overlapped upon itself to form a body-enveloping portion having body and limb receiving apertures and with portions of said overlapped parts autogenously secured together to hold them in fixed position with relation to each other and with marginal edges of said material reinforced by turning said flaps to overlap the same and autogenously securing them thereto.

WILLIAM J. GOLIGHTLY.
FRANK A. GARDINA.

REFERENCES CITED

The following references are of record in the file of this patent:

UNITED STATES PATENTS

| Number | Name | Date |
| --- | --- | --- |
| 1,169,500 | Leavitt et al. | Jan. 25, 1916 |
| 2,023,252 | Stein | Dec. 3, 1935 |
| 2,023,253 | Stein | Dec. 3, 1935 |
| 2,241,812 | Gowdy | May 13, 1941 |